US008363043B2

(12) United States Patent
Han et al.

(10) Patent No.: US 8,363,043 B2
(45) Date of Patent: Jan. 29, 2013

(54) DRIVING DEVICE WITH VOLTAGE OVERFLOW PROTECTION AND DISPLAY DEVICE INCLUDING THE DRIVING DEVICE

(75) Inventors: Sang-Ik Han, Suwon-si (KR); Yeun-Mo Yeon, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 835 days.

(21) Appl. No.: 12/174,445

(22) Filed: Jul. 16, 2008

(65) Prior Publication Data

US 2009/0021230 A1 Jan. 22, 2009

(30) Foreign Application Priority Data

Jul. 20, 2007 (KR) ........................ 10-2007-0072614

(51) Int. Cl.
*G06F 3/038* (2006.01)
*G09G 5/00* (2006.01)

(52) U.S. Cl. .......................................... 345/211; 345/87

(58) Field of Classification Search .................... 345/87, 345/95, 211–212; 323/282
See application file for complete search history.

(56) References Cited

U.S. PATENT DOCUMENTS 5,408,402 A * 4/1995 Nonnenmacher .......... 363/21.09
5,821,738 A * 10/1998 Tsuchiyama et al. .......... 323/222
6,473,284 B1 10/2002 Ilic et al.
6,538,908 B2 * 3/2003 Balakrishnan et al. .......... 363/95
6,657,841 B1 12/2003 Melchert et al.
6,975,523 B2 * 12/2005 Kim et al. .................. 363/56.11
7,459,866 B2 * 12/2008 Yu et al. ........................ 315/291
7,859,511 B2 * 12/2010 Shen et al. .................... 345/101
2005/0047048 A1 3/2005 Chin et al.
2006/0273740 A1 * 12/2006 Saeueng et al. ............... 315/291
2007/0146355 A1 * 6/2007 Bae ............................... 345/204
2008/0122829 A1 * 5/2008 Park .............................. 345/213
2008/0143705 A1 * 6/2008 Lee ............................... 345/212
2008/0186297 A1 * 8/2008 Morita ........................... 345/211

FOREIGN PATENT DOCUMENTS

| | | |
|---|---|---|
| JP | 08-205516 | 8/1996 |
| JP | 2003-033015 | 1/2003 |
| JP | 2003-303890 | 10/2003 |
| JP | 2004-260977 | 9/2004 |
| JP | 2004-336873 | 11/2004 |
| KR | 1998-0006752 | 3/1998 |
| KR | 2000-0015607 | 3/2000 |
| KR | 2000-0015611 | 3/2000 |
| KR | 2003-0081041 | 10/2003 |
| KR | 2004-0077514 | 9/2004 |
| KR | 2005-0037241 | 4/2005 |
| KR | 2005-0067779 | 7/2005 |
| KR | 2006-0019791 | 3/2006 |
| KR | 2006-0087156 | 8/2006 |

* cited by examiner

*Primary Examiner* — Chanh Nguyen
*Assistant Examiner* — Kwang-Su Yang
(74) *Attorney, Agent, or Firm* — Innovation Counsel LLP

(57) ABSTRACT

A driving circuit for a liquid crystal display and the liquid crystal display are disclosed. The liquid crystal display includes a display panel for displaying an image and a driving voltage generating circuit connected to the display panel, wherein the driving circuit includes a DC-DC converter for converting an input voltage level of a power input terminal to drive the display panel and outputting it as a driving voltage, a power line for connecting the power input terminal and the DC-DC converter, a first diode connected to a first node of the power line, a driving voltage terminal connected to an output terminal of the DC-DC converter, and a second diode connected to the first diode and the driving voltage terminal, wherein the power line includes a second node connected to a ground electrode between the first diode and the second diode.

16 Claims, 4 Drawing Sheets

DRIVING DEVICE WITH VOLTAGE OVERFLOW PROTECTION AND DISPLAY DEVICE INCLUDING THE DRIVING DEVICE

CROSS-REFERENCE TO RELATED APPLICATION

This application claims priority to and the benefit of Korean Patent Application No. 10-2007-0072614 filed in the Korean Intellectual Property Office on Jul. 20, 2007, the entire contents of which are incorporated herein by reference.

BACKGROUND OF THE INVENTION (a) Field of the Invention

The present invention relates to a driving device and a display device including the same.

(b) Description of the Related Art

A liquid crystal display includes a first display panel having a pixel electrode, a second display panel having a common electrode, a liquid crystal layer with dielectric anisotropy formed between the first display panel and the second display panel, a gate driver for driving a plurality of gate lines, a data driver for outputting data signals, and various other driving devices for generating and outputting various voltages such as gray voltages, gate driving voltages, a common electrode voltage, etc.

The data driver receives digital data signals, selects gray voltages which correspond to the input data signals, and applies them to the pixel electrode. Alignment of the liquid crystal molecules varies according to a potential difference between the pixel electrode applied with the gray voltage and the common electrode, thereby displaying images.

A liquid crystal driving voltage generator directly receives power from an external source, and outputs a switching voltage PWM_SW and a liquid crystal driving voltage AVDD. However, when the magnitude of the external voltage is abnormally high and no leakage path is available, the input voltage is directly applied to the liquid crystal driving voltage generator which could cause damages to the liquid crystal driving voltage generator. For example, a DC-DC converter of the liquid crystal driving voltage generator may be damaged by voltage overflow. Also, the switching voltage PWM_SW and the liquid crystal driving voltage AVDD outputted from a damaged liquid crystal driving voltage generator are not constant which can cause undesirable effects to the voltage levels of the gray voltages and distort the image signals.

A technical objective of the present invention is to provide a driving device and a display device including the same to prevent inner circuits of a liquid crystal display from being damaged by external voltage overflow.

The purpose this Background section is only to enhance the understanding of the background of the invention and therefore the information disclosed may not constitute prior art that is known in this country.

SUMMARY OF THE INVENTION

A driving device according to an exemplary embodiment of the present invention includes a control voltage signal generator generating a control voltage signal in response to an external signal, a clock signal generator generating a clock signal having a duty ratio that changes according to the control voltage signal, and a DC-DC converter outputting a driving voltage for converting an input voltage in response to the clock signal.

A display device according to an exemplary embodiment of the present invention includes a control voltage signal generator generating a control voltage signal in response to an external signal, a clock signal generator generating a clock signal having a duty ratio that changes according to the control voltage signal, a DC-DC converter outputting a driving voltage for converting an input voltage in response to the clock signal, and a gray voltage generator for generating gray voltages by converting a driving voltage.

As above-described, according to the driving device and a display device including the same, the driving circuit may be prevented from abnormal driving due to an overcurrent.

DETAILED DESCRIPTION OF THE EMBODIMENTS

Figure 1:
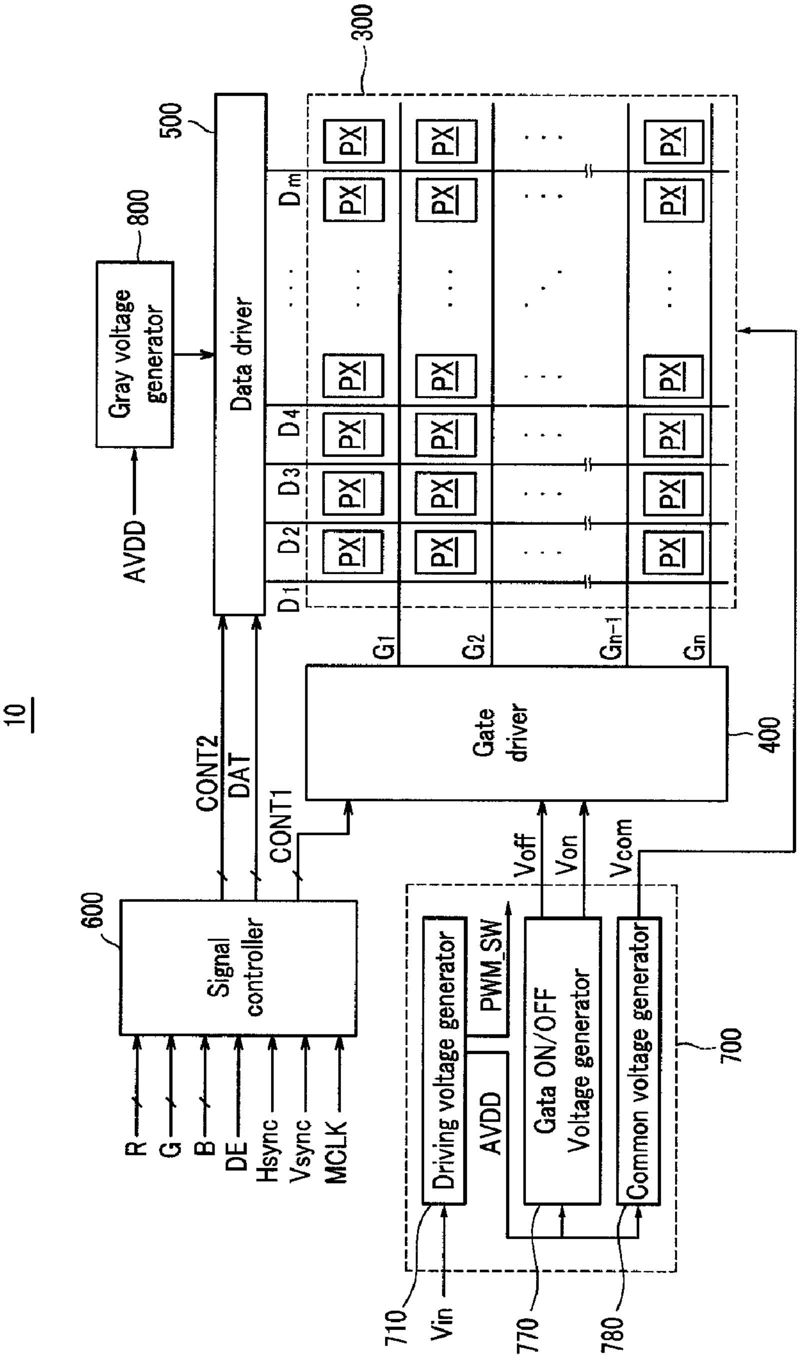
FIG. 1 is a block diagram of a liquid crystal display according to an embodiment of the present invention.

Specific examples of exemplary embodiments of the present invention are included in the following detailed description and drawings.

The advantages and characteristics of the present invention and the means for achieving them will become apparent from the following description of the preferred embodiment of the present invention. The hereafter disclosed exemplary embodiments relate to a driving device and a liquid crystal display including the same. However, the present invention is not limited to the embodiments disclosed herein, but may be modified for various display devices that display image information using a driving voltage such as an organic electroluminescent display, etc., and a driving device thereof. The present exemplary embodiments provide complete disclosure of the present invention and complete information regarding the scope of the present invention to those skilled in the art, and the present invention is defined by the scope of the claims. Throughout this specification, the same reference numerals refer to the same constituent elements.

Firstly, a liquid crystal display 10 according to exemplary embodiments of the present invention is described below with reference FIG. 1 to FIG. 3.

Figure 2:
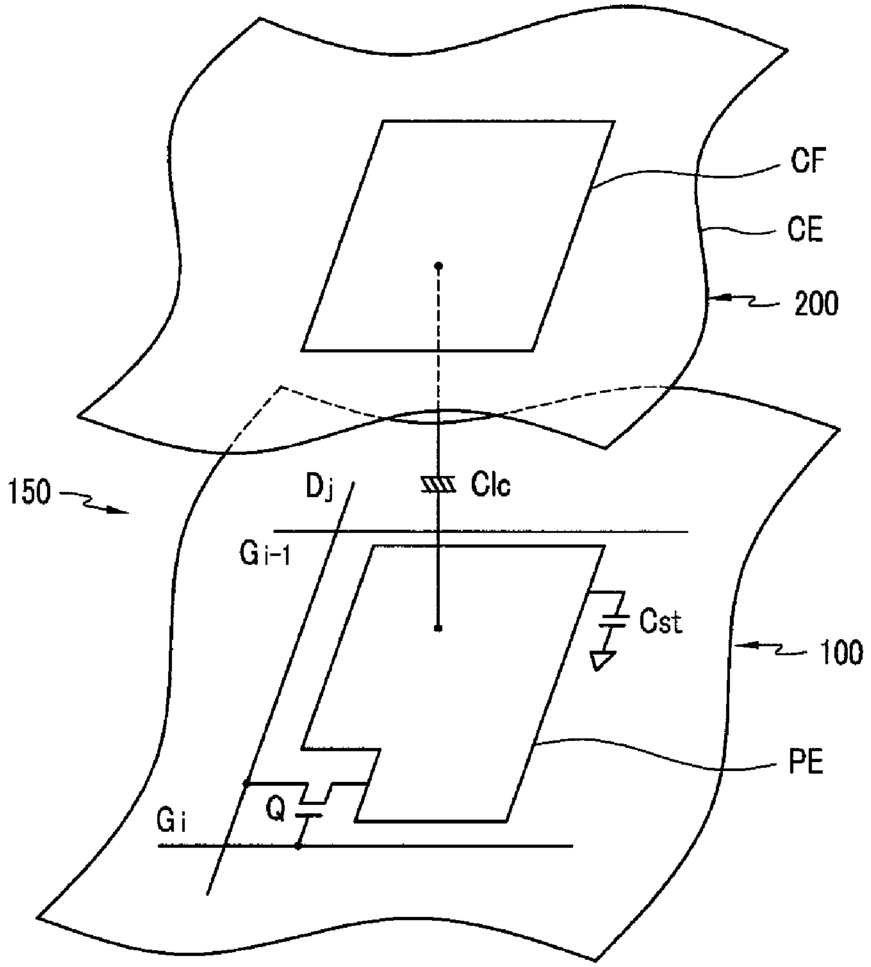
FIG. 2 is an equivalent circuit diagram of a pixel of a liquid crystal display according to an embodiment of the present invention.

FIG. 1 is a block diagram of a liquid crystal display according to an embodiment of the present invention, and FIG. 2 is an equivalent circuit diagram of a pixel of a liquid crystal display according to an embodiment of the present invention.

Referring to FIG. 1, a liquid crystal display according to an exemplary embodiment of the present invention includes a liquid crystal panel assembly 300, a gate driver 400, a data driver 500, a gray voltage generator 800, a signal controller 600, and a driving device 700.

The liquid crystal panel assembly 300 includes a plurality of signal lines G1 to Gn and D1 to Dm and a plurality of pixels PX that are connected to the plurality of signal lines and arranged in a matrix form, in terms of an equivalent circuit. Referring to FIG. 2, the liquid crystal panel assembly 300 includes a first display panel 100 and a second display panel 200 that are facing each other, and a liquid crystal layer 150 disposed therebetween.

The signal lines G1 to Gn and D1 to Dm include a plurality of gate lines G1 to Gn for delivering gate signals and a plurality of data lines D1 to Dm for delivering data signals. The gate lines G1 to Gn extend in an approximate row direction and are approximately parallel to each other, and the data lines D1 to Dm extend in a column direction and are approximately parallel to each other.

For color displays, each pixel PX may uniquely represent one of the primary colors, referred to as spatial division, or alternatively, each of the pixels may represent the primary colors in turn, referred to as temporal division. A desired color can be recognized through a spatial or temporal sum of primary colors. An example of a set of primary colors is includes red, green, and blue.

FIG. 2 is an equivalent circuit of one pixel of liquid crystal display as an example of spatial division. A color filter CF representing one of the primary colors may be disposed in a region of a common electrode CE of the upper display panel 200 facing a pixel electrode PE of the first display panel 100.

Each pixel, for example a pixel PX connected to an i-th (i=1, 2, . . . n) gate line $G_i$ and a j-th (j=1, 2, . . . m) data line $D_j$, includes a switching device Q that is connected to a signal line (Gi, Dj), a liquid crystal capacitor Clc that is connected to the switching device Q, and a storage capacitor Cst. The storage capacitor Cst may be omitted if necessary.

On the other hand, the gate driver 400 shown in FIG. 1 is connected to the gate lines $G_1$ to $G_n$. The gate driver 400 applies a gate signal that is a combination of a gate-on voltage Von and a gate-off voltage Voff from a gate on/off voltage generator 770 to the gate lines G1 to Gn.

The gate driver 400 applies a gate-on voltage Von to the gate lines G1 to Gn according to gate control signals CONT1 transmitted from the signal controller 600 to turn on the switching elements Q connected to the gate lines G1 to Gn. Then, the data signals applied to the data lines D1 to Dm are applied to corresponding pixels PX through the turned-on switching element Q.

The difference between the data signal voltage applied to the pixels PX and a common voltage Vcom applied to the common electrode CE are stored in the liquid crystal capacitor Clc as a pixel voltage. Alignment of the liquid crystal molecules varies according to the magnitude of the pixel voltage which changes the polarization of light passing through the liquid crystal layer 150.

The data driver 500 is connected to the data lines D1 to Dm of the liquid crystal panel assembly 300. The data driver 500 selects a grayscale voltage generated by the grayscale voltage generator 800 and applies the selected grayscale voltage to the data lines D1 to Dm as data signals. In a case where the grayscale voltage generator 800 generates only a predetermined number of the reference grayscale voltages instead of all grayscale voltages, the data driver 500 may generate the grayscale voltages for all the grayscale voltages by dividing the reference grayscale voltages and selecting the data signals among the generated grayscale voltages.

The gate driver 400 or the data driver 500 may be installed directly on the liquid crystal panel assembly 300 as a form of a plurality of driver integrated circuit chips. Alternatively, the drivers 500 or 400 may be installed on a flexible printed circuit film (not shown) to be attached to the liquid crystal panel assembly 300 in the form of a tape carrier package (TCP). Alternatively, the gate driver 400 or the data driver 500 may be integrated with the liquid crystal panel assembly 300 together with the signal lines G1 to Gn and D1 to Dm, the switching element Q, and the like.

The signal controller 600 receives input image signals R, G, and B and input control signals for controlling display of the input image signals R, G, and B from an external graphics controller (not shown). Examples of the input control signals include a vertical synchronization signal Vsync, a horizontal synchronization signal Hsync, a main clock signal MCLK, and a data enable signal DE.

The signal controller 600 processes the input image signals R, G, and B according to an operating condition of the liquid crystal panel assembly 300 based on the input image signals R, G, and B and the input control signals to generate a gate control signal CONT1, a data control signal CONT2, and the like, and thereafter sends the generated data control signal CONT1 to the gate driver 400 and the generated data control signal CONT2 and the processed image signal DAT to the data driver 500.

On the other hand, the driving device 700 of FIG. 1 includes a driving voltage generator 710, the gate on/off voltage generator 770, and a common voltage generator 780.

The driving voltage generator 710 generates the required voltages for driving the liquid crystal display. The driving voltage generator 710 receives an input voltage Vin, generates a switching voltage PWM_SW and a liquid crystal driving voltage AVDD, provides them to the gray voltage generator 800, and provides the liquid crystal driving voltage AVDD to the gate on/off voltage generator 770 and the common voltage generator 780. The liquid crystal driving voltage AVDD is generated by rectifying the switching voltage PWM_SW, and is a reference gray voltage for generating gray voltages of a plurality of levels.

The driving voltage generator 710 will be described with reference to FIG. 4.

The gray voltage generator 800 receives the liquid crystal driving voltage AVDD from the driving voltage generator 710 to generate gray voltages.

The gray voltage generator 800 includes a plurality of resistors (not shown) coupled in series between a node (not shown) applied with the liquid crystal driving voltage AVDD and ground which divides the driving voltage to generate the gray voltages. The inner circuits of the gray voltage generator 800 are not limited by this structure, and may be variously modified.

Next, the driving voltage generator of the driving device according to the exemplary embodiment of the present invention will be described in detail with reference to FIG. 3 and FIG. 4.

Figure 3:
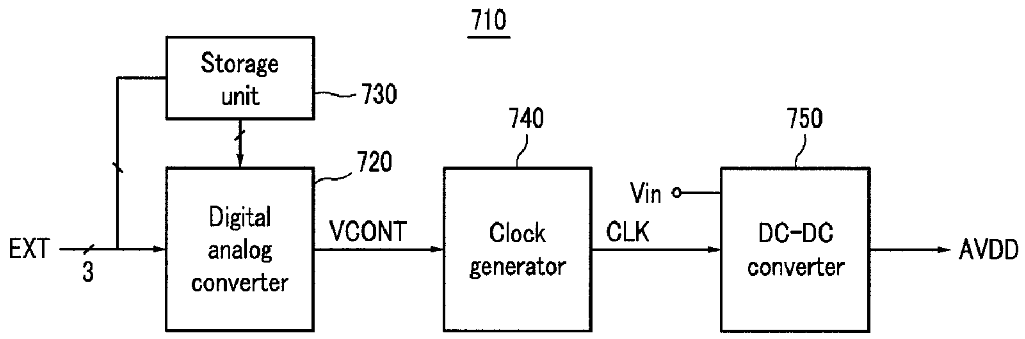
FIG. 3 is a block diagram of a driving voltage generator according to an exemplary embodiment of the present invention.
Figure 4:
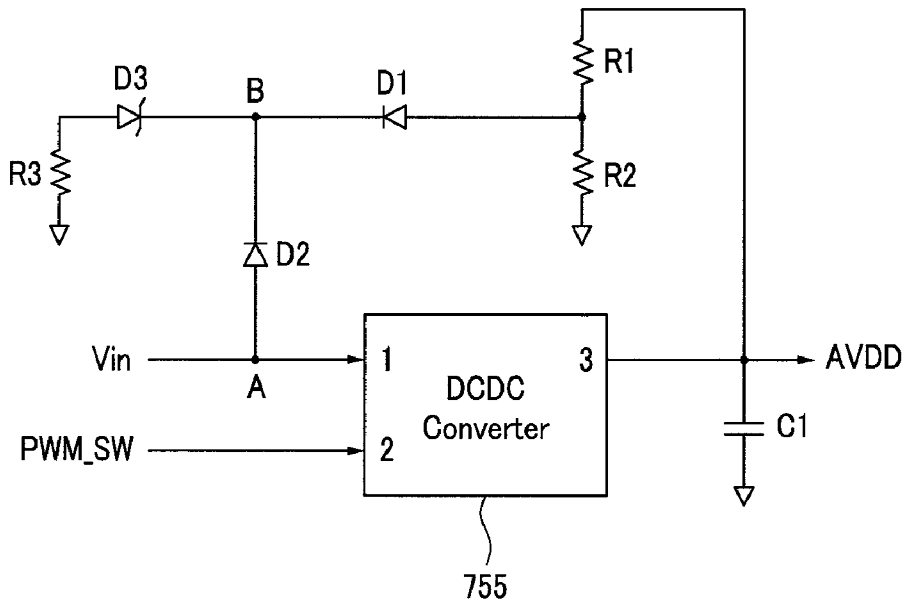
FIG. 4 is a circuit diagram of the driving voltage generator according to an exemplary embodiment of the present invention.

FIG. 3 is a block diagram of a driving voltage generator according to an exemplary embodiment of the present invention, and FIG. 4 is a circuit diagram of a portion of the driving voltage generator shown in FIG. 3.

Referring to FIG. 3, the driving voltage generator 710 includes a digital-to-analog converter 720, a storage unit 730, a clock generator 740, and a DC-DC converter 750.

An external signal EXT for controlling the driving voltage AVDD is inputted to the driving voltage generator 710, the drawing shows a case where the external signal EXT is inputted in parallel with a digital signal of three bits.

The digital-to-analog converter 720 converts the external signal EXT into a control voltage signal VCONT of an analog type to provide it to the clock generator 740.

The digital-to-analog converter 720 may include a plurality of resistors (not shown) connected in series and distributing the levels of the reference voltage Vref, switching elements (not shown) respectively connected to nodes having voltages of different levels, and decoders (not shown).

Using an example of the external signal EXT being a 3-bit digital signal "101", the operation of the digital-to-analog converter 720 is explained below. When "101" is inputted to the decoder, only a switching element corresponding to "101", is turned on by the decoder. Here, the reference voltage Vref is dropped through several resistors, and a voltage level corresponding to "101" is generated and output as a control voltage signal VCONT through a buffer (not shown).

The storage unit 730 stores the external signal EXT. The driving voltage AVDD is regulated through the external signal EXT, and the external signal EXT is stored in the storage unit. Accordingly, even though the external signal EXT is not continually applied by the user, the storage unit 730 provides the external signal EXT to the digital-to-analog converter 720.

The storage unit 730 may be an electrically erasable programmable read-only memory (EEPROM) or an erasable programmable read-only memory (EPROM), in which the stored data may be modified according to the external signal EXT.

The clock generator 740 receives the control voltage signal VCONT from the digital-to-analog converter 720, and generates a clock signal CLK which has a duty ratio that changes according to the voltage level of the control voltage signal VCONT.

The clock generator 740 includes an oscillator (not shown) and a comparator (not shown) and generates a clock signal CLK which has a duty ratio that changes according to the control voltage signal VCONT.

When the clock generator 740 is operated, the oscillator generates a reference clock signal RCLK with an uniform frequency. The comparator compares the reference clock signal RCLK generated from the oscillator and the control voltage signal VCONT provided by the digital-to-analog converter 720, outputs a voltage of predetermined level when the level of the control voltage signal VCONT is higher than the level of the reference clock signal RCLK, and outputs zero volts to generate the clock signal CLK when the level of the control voltage signal VCONT is lower than the level of the reference clock signal RCLK. Here, since the frequency of the reference clock signal RCLK is uniform, the duty ratio of the clock signal CLK is changed according to the level of the control voltage signal VCONT.

The DC-DC converter 750 converts the input voltage Vin according to the duty ratio of the clock signal CLK provided from the clock generator 740 and outputs it as the driving voltage AVDD.

Figure 5:
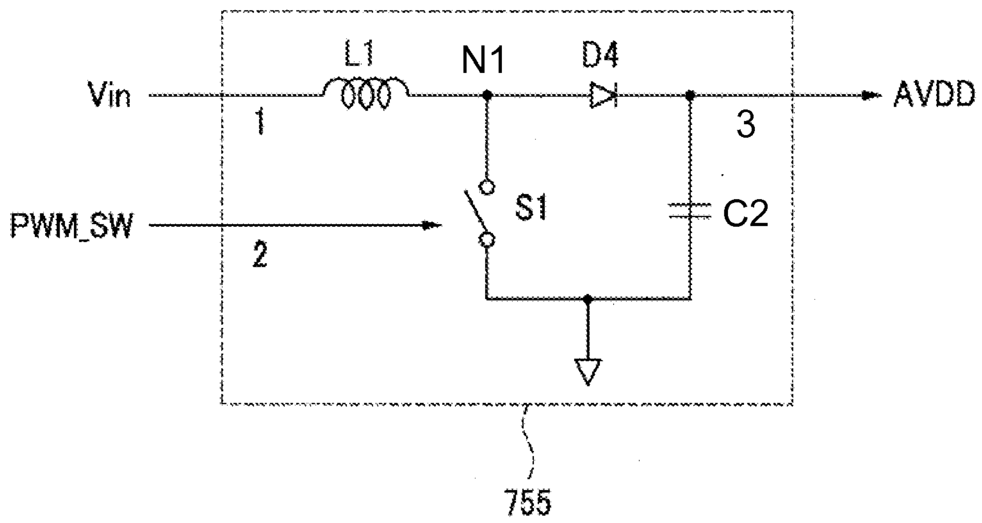
FIG. 5 is a circuit diagram of the DCDC Converter according to an exemplary embodiment of the present invention.

Referring to FIG. 4 and FIG. 5, the driving voltage generator 710 according to an exemplary embodiment of the present invention includes the DC-DC converter 755, and outputs the switching voltage PWM_SW and the liquid crystal driving voltage AVDD.

The DC-DC converter 755 includes 3 terminals. Here, the terminal 1 is applied with the DC voltage Vin, and the terminal 2 is applied with the switching voltage PWM_SW. The terminal 3 outputs the liquid crystal driving voltage AVDD in response to the DC voltage Vin and the switching voltage PWM_SW.

The terminal 1 of the DC-DC converter 755 feeds back the liquid crystal driving voltage AVDD that is divided by the resistors R1 and R2.

The DC-DC converter 755 includes an inductor L1, a diode D4, a capacitor C2, and a switch S1 as a boost converter.

Figure 6:
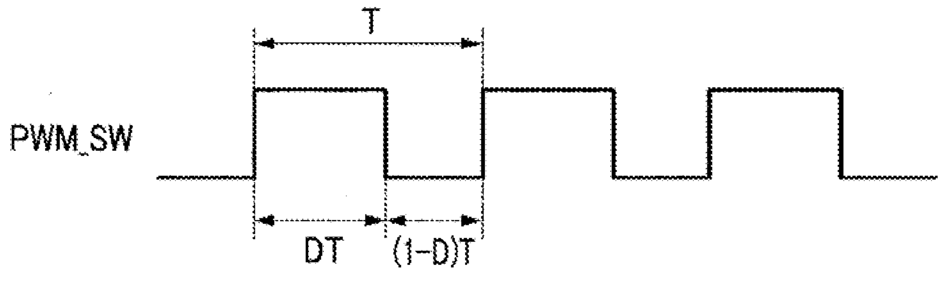
FIG. 6 is a wave form diagram of the switching voltage PWM_SW.

Referring to FIG. 6, one cycle of the switching voltage PWM_SW is T. The switching voltage PWM_SW has a high level during DT and has a low level during (1−D)T. Here, D is larger than 0 and smaller than 1. When the switching voltage PWM_SW is in the high level, the switch S1 is turned on and when the switching voltage PWM_SW is in the low level, the switch S1 is turned off. During DT, the node N1 is supplied with a ground voltage through the switch S1 and a reverse bias is applied to the diode D4. Therefore, a current output from the Vin flows to the ground via the inductor L1. At this time, energy stored in the inductor L1 may be expressed as below:

$$E1=-Vin*DT$$

During (1−D)T, the switch S1 is turned off and the current output from the Vin charges the capacitor C2 through the diode D4 which is forward-biased. As this time, energy discharged from the inductor L1 may be expressed as below:

$$E2=(Vin-AVDD)*(1-D)T$$

In a steady state, the energy discharged from the inductor L1 is the same as the energy stored in the inductor L1. Accordingly, E1 and E2 are the same. Therefore, AVDD may be expressed as below:

$$AVDD=Vin/(1-D)$$

Accordingly, AVDD is determined by the length of the high level period of the switching voltage PWM_SW.

When the overflow voltage flows in from the power input terminal Vin, because the anode electrode of the diode D2 is connected to the node A and the cathode electrode is connected to a node B, the driving voltage generator 710 is protected. An anode electrode of a diode D1 is connected to a terminal between the resistors R1 and R2 that are connected to the liquid crystal driving voltage A VDD terminal, and the cathode electrode thereof is connected to the node B. Therefore, the current which inflows to the liquid crystal driving voltage A VDD terminal due to the external overflow voltage may be suppressed. Also, the node B is connected to the cathode electrode of a diode D3. The anode electrode of the diode D3 is connected to the ground electrode. The diode D3 may be a Zener diode. Accordingly, the Zener diode D3 uniformly maintains the liquid crystal driving voltage A VDD such that the power consumption of the driving circuit may be reduced. Also, circuit damage of the driving voltage generator 710 may be prevented. A resistor R3 may be coupled between the Zener diode D3 and the ground electrode to be used as an voltage maintaining resistor.

Next, the method for protecting the circuit of the driving voltage generator 710 by using the circuit for preventing the overflow voltage according to the present invention is described.

Upon normal driving, since the voltage of the node A has an input voltage rating (for example, 5V) that is less than the liquid crystal driving voltage AVDD (for example, 11-15V), the voltage does not pass the diode D2, and is applied to the DC-DC converter 755. Also, according to a protective circuit of the present exemplary embodiment, the diode D1 may be turned on by the voltage generated at the connection between the resistors R1 and R2 that are connected to the liquid crystal driving voltage AVDD. The voltage range of the power input terminal Vin directly applied to the DC-DC converter 755 may be controlled by setting the condition for turning on the diode D2 according to the condition for turning on the diode D1.

Upon abnormal driving in which the overflow current (EOS, electrical overstress) is applied from the power input terminal, because the voltage of the node A is larger than the voltage of the node B, the diode D2 is turned on. Accordingly, the high voltage is not applied to the input terminal of the DC-DC converter 755. Also, when the diode D2 is turned on, the diode D1 is turned off such that the overflow voltage is not applied to the liquid crystal driving voltage AVDD terminal, thereby protecting the output terminal of the DC-DC converter 755. The range of the overflow current directly flowing into the DC-DC converter 755 may be controlled by controlling the voltage for turning on the diode D2 by the voltage generated at the connection between the resistors R1 and R2 that are connected to the liquid crystal driving voltage AVDD.

As above-described, the overcurrent protection circuit is provided to the driving voltage generator 710 such that the liquid crystal panel and the circuit of the driving device may be protected.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving circuit for generating a liquid crystal driving voltage, the driving circuit having a liquid crystal driving voltage terminal and a reference voltage terminal, the driving circuit comprising:

a power input terminal;

a DC-DC converter having an input terminal coupled to the power input terminal, the DC-DC converter further having an output terminal, the DC-DC converter converting an input voltage level provided at the power input terminal to the liquid crystal driving voltage and outputting the liquid crystal driving voltage through the output terminal to the liquid crystal driving voltage terminal;

a first diode having an anode terminal coupled to the input terminal of the DC-DC converter and the power input terminal, the first diode further having a cathode terminal coupled to the reference voltage terminal;

a second diode having an anode terminal coupled to the liquid crystal driving voltage terminal, the second diode further having a cathode terminal directly coupled to the cathode terminal of the first diode; and a zener diode, wherein the input terminal of the DC-DC converter is connected through the first diode to the zener diode, and the output terminal of the DC-DC converter is electrically connected through the second diode to the zener diode.

2. The driving circuit of claim 1, wherein the zener diode includes a cathode terminal connected to the cathode terminal of the second diode, and the zener diode further includes an anode terminal coupled to the reference voltage terminal.

3. The driving circuit of claim 2, further comprising a resistor including a first electrode and a second electrode, the first electrode connected to the anode electrode of the zener diode and the second electrode connected to the reference voltage terminal.

4. The driving circuit of claim 1, further comprising a resistance voltage divider coupled between the liquid crystal driving voltage terminal and the reference voltage terminal, the resistance voltage divider being connected to the anode of the second diode, the resistance voltage divider dividing the liquid crystal driving voltage to generate a feedback voltage, wherein the driving circuit transmits the feedback voltage through at least the second diode.

5. The driving circuit of claim 1, wherein the liquid crystal driving voltage terminal is connected to a terminal of the DC-DC converter through a resistor and a capacitor connected in parallel to each other.

6. The driving circuit of claim 1, further comprising:

an inductor connected to the output terminal of the DC-DC converter and electrically connected through the input terminal of the DC-DC converter to the anode terminal of the first diode; and a third diode having an anode electrode connected to the inductor and a cathode electrode connected to the liquid crystal driving voltage terminal.

7. The driving circuit of claim 6, wherein:

the DC-DC converter generates a switching voltage and applies the switching voltage between the inductor and the third diode, and the driving circuit further comprises: a control voltage signal generator converting the voltage level of the control voltage signal in response to an external signal; and a clock signal generator generating a clock signal having a duty ratio that is a function of a voltage level of the control voltage signal.

8. The driving circuit of claim 1, further comprising at least two resistors connected in series between the liquid crystal driving voltage terminal and the reference voltage terminal, wherein the anode terminal of the second diode is connected to a junction between the at least two resistors.

9. A liquid crystal display comprising:

a liquid crystal display panel for displaying an image; and a driving voltage generating circuit connected to the display panel, wherein the driving voltage generating circuit comprises:

a DC-DC converter converting a magnitude of an input voltage received from a power input terminal to a liquid crystal driving voltage to drive the liquid crystal display panel, the DC-DC converter including an input terminal for receiving the input voltage, the DC-DC converter further including an output terminal for outputting the liquid crystal driving voltage;

a conductor line connecting the power input terminal to the input terminal of the DC-DC converter;

a first diode having an anode terminal coupled to the input terminal of the DC-DC converter and the power input terminal, the first diode further having a cathode terminal coupled to a reference voltage terminal;

a second diode having an anode terminal coupled to the liquid crystal driving voltage terminal and a cathode directly connected to the cathode terminal of the first diode; and a resistance voltage divider electrically coupled with the output terminal of the DC-DC converter for receiving the liquid crystal driving voltage, the resistance voltage divider dividing the liquid crystal driving voltage to generate a feedback voltage, wherein the driving voltage generating circuit transmits the feedback voltage through at least the second diode to the first diode.

10. The liquid crystal display of claim 9, further comprising a zener diode including a cathode terminal connected to both the cathode terminal of the first diode and a cathode terminal of the second diode, the zener diode further including an anode terminal coupled to the reference voltage terminal.

11. The liquid crystal display of claim 10, further comprising a resistor including a first electrode and a second electrode, the first electrode connected to the anode electrode of the zener diode, and the second electrode connected to the reference voltage terminal.

12. The liquid crystal display of claim 9, wherein the anode terminal of the second diode is connected to the resistance voltage divider, and the resistance voltage divider is coupled between the liquid crystal driving voltage terminal and the reference voltage terminal.

13. The liquid crystal display of claim 9, wherein the liquid crystal driving voltage terminal is connected to the input terminal of the DC-DC converter through a resistor and a capacitor that are connected in parallel to each other.

14. The liquid crystal display of claim 9, further comprising:

an inductor connected to the output terminal of the DC-DC converter and electrically connected through the input terminal of the DC-DC converter to the anode terminal of the first diode; and a third diode having an anode terminal connected to the inductor and a cathode terminal connected to the liquid crystal driving voltage terminal.

15. The liquid crystal display of claim 14, wherein:

the DC-DC converter generates a switching voltage and applies the switching voltage between the inductor and the third diode, and the liquid crystal display further comprises: a control voltage signal generator that converts a voltage level of a control voltage signal in response to an external signal and a clock signal generator that generates a clock signal having a duty ratio that is a function of a voltage level of the control voltage signal.

16. The liquid crystal display of claim 9, comprising at least two resistors connected in series between the liquid crystal driving voltage terminal and the reference voltage terminal, wherein the anode terminal of the second diode is connected to a junction between the at least two resistors.

* * * * *